United States Patent [19]

Sato et al.

[11] 4,401,846

[45] Aug. 30, 1983

[54] DEVICE ADAPTED FOR SUPPORTING CONDUCTORS, AND THE COMBINATION OF THE CONDUCTORS AND THE SUPPORTING DEVICE

[75] Inventors: Takayuki Sato, Akikawa; Akira Tanaka, Kawashima, both of Japan

[73] Assignee: Tokyo Shibaura Denki Kabushiki Kaisha, Kawasaki, Japan

[21] Appl. No.: 194,860

[22] Filed: Oct. 7, 1980

[30] Foreign Application Priority Data

Oct. 9, 1979 [JP] Japan ............................. 54-129406
Apr. 21, 1980 [JP] Japan ............................. 55-51706

[51] Int. Cl.³ ............................................. H02G 5/00
[52] U.S. Cl. ............................. 174/149 B; 29/631; 174/88 B; 174/156
[58] Field of Search ............. 174/88 B, 111, 149 B, 174/152 G, 155, 156, 157, 167; 361/341, 355, 361, 425; 339/22 B

[56] References Cited

U.S. PATENT DOCUMENTS

| 874,834 | 12/1907 | Copping | 174/167 X |
| 1,726,101 | 8/1929 | Edson | 174/155 |
| 2,648,719 | 8/1953 | Smith et al. | 174/111 X |
| 3,104,276 | 9/1963 | Cataldo et al. | 174/88 B |
| 3,183,298 | 5/1965 | Weimer et al. | 174/88 B |
| 3,365,537 | 1/1968 | Fehr, Jr. et al. | 174/88 B |
| 4,146,285 | 3/1979 | Cook | 174/88 B X |

FOREIGN PATENT DOCUMENTS 400639 3/1968 Australia .................. 174/88 B

Primary Examiner—Laramie E. Askin
Attorney, Agent, or Firm—Oblon, Fisher, Spivak, McClelland & Maier

[57] ABSTRACT

An insulating support device for supporting at least one conductor having a hole therein, including at least two hollow tubular insulating support members each including a partition having a circular hole concentric with the tubular support member, wherein the support members are disposed on either side of the conductor with the partition holes thereof coaxial with the conductor hole. An elongated insulating tube passes through the partition holes of the support members and the conductor hole and a support rod is passed through the insulating tube such that the pair of support members are in a free relationship with the support rod. Each hollow tubular insulating support member includes opposed half sections, each having a semi-annular shaped cross section including a semi-annular shaped partition located therein, wherein the opposed half sections are joined at their respective longitudinal edge surfaces to form an essentially hollow cylinder. End caps including a concentric hole and a peripheral raised edge portion are coupled to the ends of the hollow cylinders such that the raised edge portions surround a portion of the outer peripheral surface of the hollow cylinder support member.

18 Claims, 13 Drawing Figures

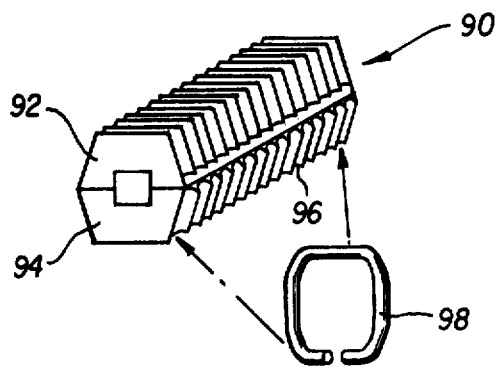
FIG. 11
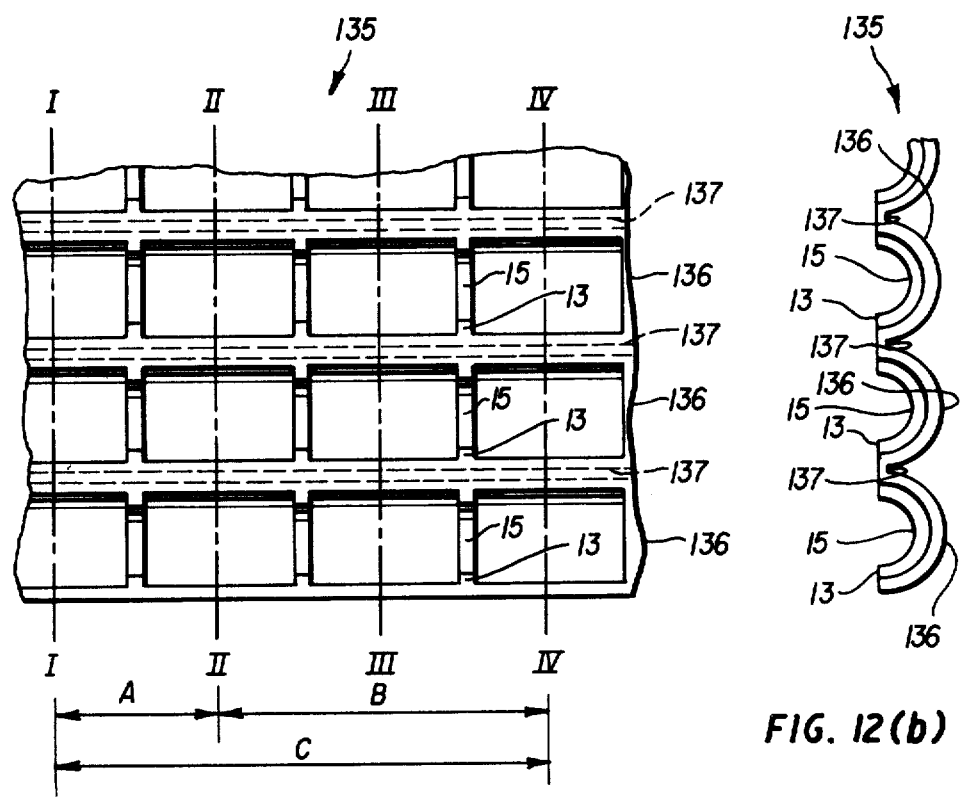
FIG. 12(a)
FIG. 12(b)

DEVICE ADAPTED FOR SUPPORTING CONDUCTORS, AND THE COMBINATION OF THE CONDUCTORS AND THE SUPPORTING DEVICE

BACKGROUND OF THE INVENTION

1. Field of the Invention

The present invention relates in general to a novel device for supporting conductors, and more particularly to a novel device for supporting a plurality of parallel conductors, and each conductor being insulated from the other conductors. The invention also relates to an insulating support and more particularly to an insulating support which is used in a device for supporting conductors.

2. Description of the Prior Art

Currently the amount of electric energy used is becoming larger and larger. Thus, the size of the conductors of the main bus bars in, for example, a metal-enclosed switchgear, has necessarily been increased. In this situation the shock due to the electromagnetic force applied to the conductors becomes large when the main bus bars are short-circuited. Therefore, the device for supporting the conductors and the insulating supports are required to be sufficiently strong to endure this shock. As a result of this requirement, the amount of insulating material used in the insulating supports becomes large.

Hereinafter, a device for supporting conductors used in a metal-enclosed switchgear will be explained as an example. FIG. 1 shows a commonly used metal-enclosed switchgear and FIG. 2 shows a device for supporting conductors in the metal-enclosed switchgear in FIG. 1. In FIG. 1 and FIG. 2 three parallel conductors 1A, 1B, and 1C are shown which correspond to a three phase run. Insulating supports 3, each including a threaded bore hole 2 at each end, are inserted between the conductors 1A, 1B, 1C and between the outer conductors 1A, 1C and bracket hardware 5. A bolt 7 is inserted into each of the outer insulating supports 3 through a through-hole, not shown, in the bracket hardware 5 and is screwed into the threaded bore hole 2 in the outer insulating support 3. A stud 6 having a threaded terminal at each end thereof is inserted into the insulating supports 3 which are adjacent to each other through throughholes 4 in the conductors 1A, 1B, 1C. Each threaded terminal portion of this stud 6 is screwed into one of the threaded bore holes 2 in the insulating supports 3.

The device for supporting conductors is constructed as explained above, so very large compressive forces or tensile forces are applied to the insulating support 3 by the electromagnetic force applied to the conductors 1A, 1B, 1C when the main bus bars are short-circuited. As the insulating support 3 is made of insulating material, it exhibits lower strength to tensile forces than to compressive forces. Therefore, in order to endure large electromagnetic forces, the cross-section of the insulating support 3 must be large and the threaded bore holes 2 of the insulating support 3 must be constructed to increase the friction force at the threaded bore holes 2. Thus each insulating support 3 must be made very large and the insulating material used in each insulating support 3 must be strong. As a result, the weight of each insulating support 3 and the apparatus for supporting the insulating supports become large. Also, much precision is required to make the threaded bore holes in the insulating support 3, thereby requiring much time and expense. If the stud 6 is too long in relation to the depth of this threaded bore hole, the conductors will not be sufficiently supported, so the length of the stud 6 must be controlled precisely. Also, it is necessary to screw the stud 6 equally into each threaded bore hole 2 of the insulating supports 3. As explained above, its takes a lot of time and expense to assemble the prior art device for supporting conductors. Moreover, the gap between the conductors 1A, 1B, 1C changes according to the lay out of the conductors and the rating current of the conductors, so insulating supports of varying length are required. Thus, various sized molds for forming the various sized insulating supports are required. As a result, the cost of making the insulating support 3 becomes large. The prior art devices for supporting conductors and insulating supports have the defects described above.

SUMMARY OF THE INVENTION

Accordingly, one object of this invention is to provide a novel device for supporting conductors which is strong enough to withstand the shock caused by electromagnetic forces due to a short-circuited condition.

Another object of this invention is to provide a novel device for supporting conductors which can be assembled easily.

Another object of this invention is to provide a novel device for supporting conductors which is reduced in weight as compared to prior art devices.

Another object of this invention is to provide an insulating support which contains less insulating material than prior art devices thereby achieving a reduction in weight.

Another object of this invention is to provide an insulating support which can be made easily without the need for threaded bore holes formed therein.

A further object of this invention is to provide an insulating support which can easily be adapted to changes in the spacing between conductors.

These and other objects of the present invention can be achieved by providing a device for supporting a plurality of parallel conductors. Each of the parallel conductors includes a hole through its surface such that all of the holes have a common axis. The device includes first and second bracket members located on either side of the plurality of parallel conductors. Each bracket member includes a hole through its surface aligned with the common axis passing through the holes in the conductors. An elongated cylindrical insulating member having a longitudinal hole therein is positioned through the holes in the plurality of parallel conductors. A support member is located within the longitudinal hole in the insulating member and passes through the holes in the first and second bracket members where it is attached by a fastening means. The device further includes a plurality of tubular insulating supports which surround the insulating member. One of the insulating supports is located between each of the plurality of parallel conductors, between one of the conductors and the first bracket member, and between one of the conductors and the second bracket member. Each of the plurality of insulating supports includes a centrally located partition therein which has a hole through its surface through which the insulating member passes.

Additionally, these and other objects of the present invention can be achieved by providing an insulating support device which includes a tubular insulating support member. A partition is located inside the tubular support member. The partition includes a circular hole through its surface which is concentric with the support member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11 is a perspective view of an insulating support according to another embodiment of the present invention; and FIGS. 12(a) and 12(b) are elevational and side views respectively for illustrating a method for making insulating supports according to an embodiment of the present invention.

DETAILED DESCRIPTION OF THE PREFERRED EMBODIMENTS

Figure 1:
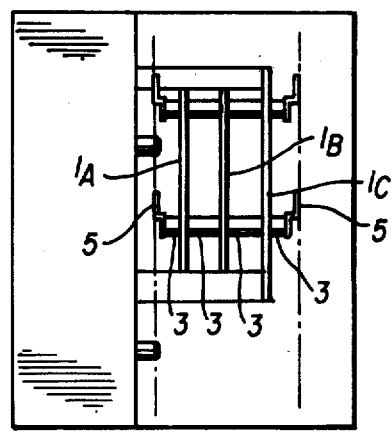
FIG. 1 is a cross-section view of a conventional device for supporting conductors in a metal-enclosed switchgear.
Figure 2:
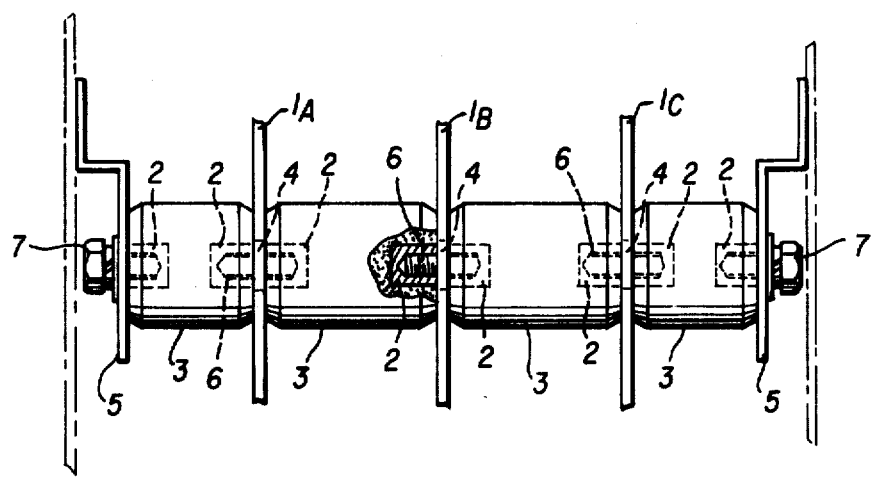
FIG. 2 is an elevational view of the device partially broken away in the metal-enclosed switchgear shown in FIG. 1.
Figure 3:
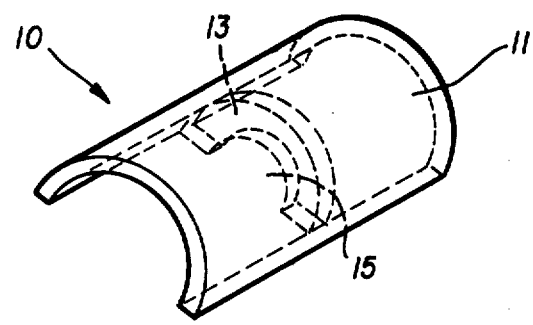
FIG. 3 is a perspective view which shows the construction of an insulating support according to a preferred embodiment of the present invention.

Referring now to the drawings, wherein like reference numerals designate identical or corresponding parts throughout the several views, and more particularly to FIG. 3 thereof, an insulating support 10 according to a preferred embodiment of this invention is shown. The insulating support 10 is shown as being assembled from a pair of half sections 11 and 12 made of insulating material. The shape of the insulating support 10 is a hollow cylinder having, for example, a circular cross-section and the shape of each half section 11, 12 is a longitudinal semi-cylinder. Each half section 11, 12 has a partition 13 and 14, respectively, located inside the half section and positioned midway between the ends of the half section.

Each partition 13, 14 includes a semi-circular shaped hole 15 and 16, respectively, located through its surface concentric with the center line of the half section. Each half section 11, 12 and its respective partitions 13, 14 have H-shaped cross sections.

Figure 4:
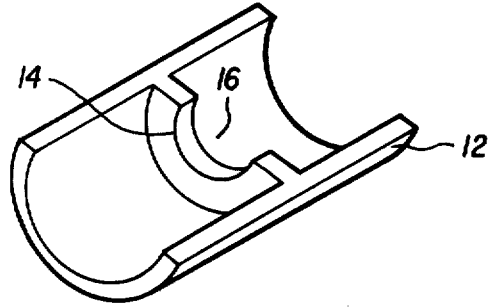
FIG. 4 is a perspective view of the assembled insulating support shown in FIG. 3.
Figure 4:
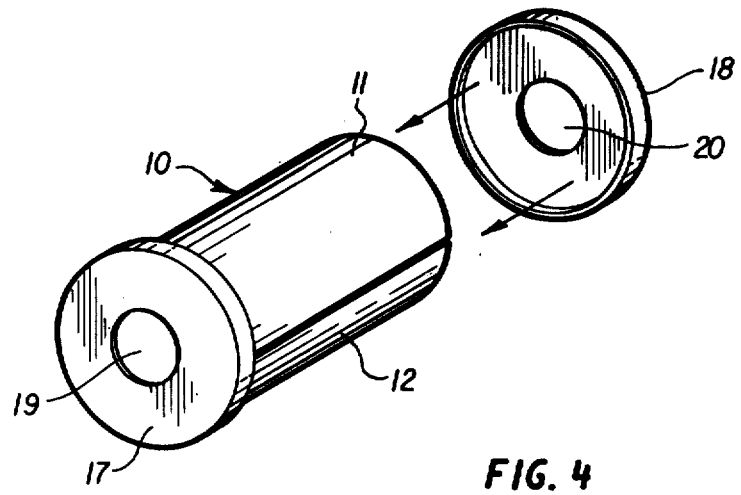

In FIG. 4 the pair of half sections 11 and 12 are assembled to form the cylindrical shaped insulating support 10. The insulating support 10 is held together by inserting a pair of retaining caps 17 and 18 onto each end portion thereof. Each retaining cap 17, 18 includes a concentric hole 19 and 20, respectively, formed in its surface. The concentric holes 19 and 20 and the holes 15 and 16 in the halfsections 11 and 12 combine to form a common concentric hole through the insulating support 10.

Figure 5:
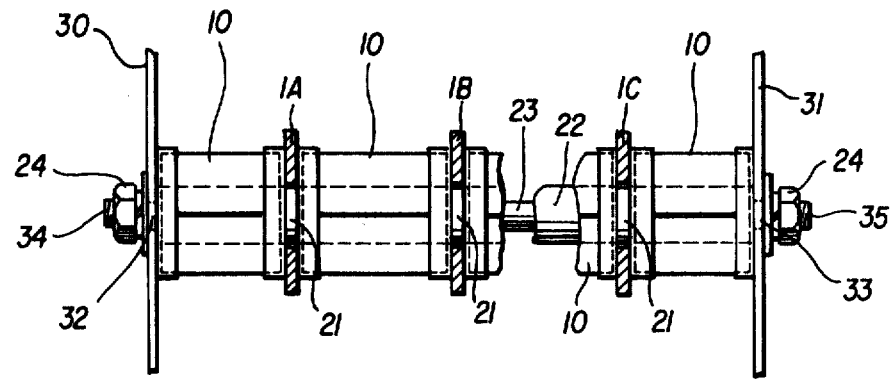
FIG. 5 is an elevational view of a device for supporting conductors partially broken away according to a preferred embodiment of the present invention using the insulating support shown in FIG. 4.

FIG. 5 shows a device for supporting conductors according to a preferred embodiment of the present invention using the insulation support 10 described above. In FIG. 5, reference numerals 30 and 31 designate a pair of fixtures or bracket members provided opposite to each other in a metal-enclosed switchgear (not shown). These conductors 1A, 1B, and 1C representing three phase electric power conductors are provided in parallel with each other and located between the pair of fixtures or bracket members 30 and 31. An insulating support 10 is provided between each of the conductors 1A, 1B, and 1C and between each of the outer conductors 1A, 1C and the pair of fixtures or bracket members 30, 31. An insulating pipe 22 is inserted into through holes 21 passing through each of the conductors 1A, 1B, 1C and the through holes (not shown) of the insulating supports 10. A stud 23 having threaded terminals 34 and 35 at each end thereof is inserted into the insulating pipe 22 through throughholes 32 and 33 of the pair of fixtures or bracket members 30, 31 respectively. The threaded terminals 34, 35 of the stud 23 which project through the pair of fixtures or bracket members 30, 31 are fastened to the pair of fixtures or bracket members by nuts 24.

When the device for supporting conductors is constructed as explained above, the stud 23 and the insulating supports 10 are in a free relationship. Thus, when the main bus bars are shortcircuited, the tensile force due to electromagnetic force does not act on the insulating supports 10 because it acts only on the stud 23 and the nuts 24 attached thereto. The compressive force due to the electromagnetic force acts on both ends of each insulating support 10, but each insulating support 10 is sufficiently strong to resist the compression force. Thus, the insulating supports 10 can support the conductors without increasing the cross-section thereof. Since the insulating support 10 has a hollow cylindrical shape, the insulating support can be made large in diameter without using much insulating material. Therefore, the insulating support 10 is very light in weight and can be made with very low cost. Since the longitudinal cross-section of the insulating support 10 is an approximate H-shape, it is sufficiently strong such that it does not deform and thus is superior in safety. Also, the insulating support 10 is easy to make because threaded bore holes are not required. The device for supporting conductors using the insulating support 10 can support a plurality of conductors safely and can prevent the conductors from twisting due to electromagnetic force. Additionally, the device for supporting conductors can be assembled easily and weighs much less than prior art devices. In the embodiment of this invention explained above, the stud 23 is used as a supporting member; however, a bolt with only one threaded end terminal portion can also be used as a supporting member with good results.

Figure 6:
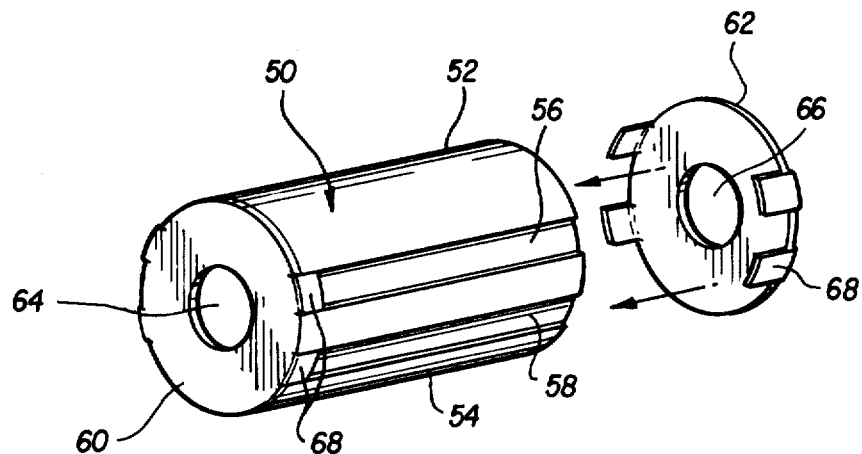
FIG. 6 is a perspective view of an insulating support according to another embodiment of the present invention.

In FIG. 6 an insulating support 50 according to another embodiment of the present invention is shown as being formed from a pair of half sections 52 and 54 similar to the half sections 11 and 12 shown in FIG. 3.

However, in the present embodiment, each half section 52, 54 includes a pair of grooves 56, 58 respectively extending longitudinally along its outer surface. Only one groove of each pair of grooves is shown in FIG. 6. A pair of disc shaped end caps 60, 62 are each shown as including a circular through hole numbered 64 and 66 respectively and as each including four tabs 68. The insulating support 50 is assembled by inserting the four tabs 68 into four grooves 56, 58 of a pair of the half sections 52 and 54.

Figure 7:
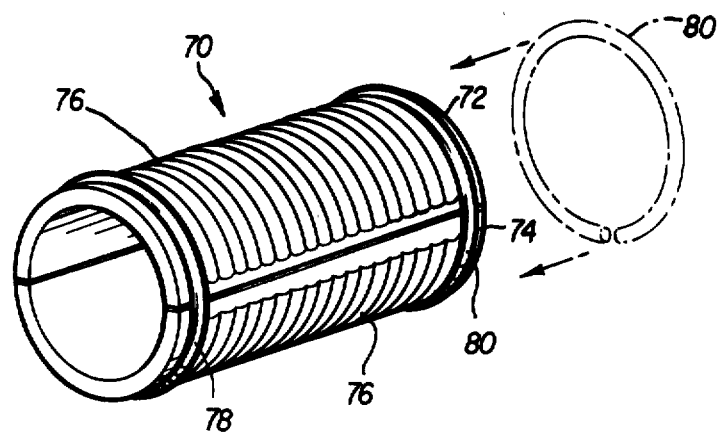
FIG. 7 is a perspective view of an insulating support according to still another embodiment of the present invention.

In FIG. 7, an insulating support 70 according to still another embodiment of this invention is shown. In FIG. 7 each half section 72, 74 of the insulating support 70 is similar to the half sections 11 and 12 shown in FIG. 3 and includes a plurality of circumferential corrugations 76 located on the outer surface thereof. The insulating support 70 is assembled by inserting a pair of retaining rings 78 and 80 into the corrugations at each end of the pair of half sections as shown in FIG. 7. Due to the plurality of corrugations 76 located on the exterior of the insulating support 70, the distance longitudinally along the surface of the insulating support becomes large compared with that of the insulating supports 10 and 50 discussed above and thus the ability to withstand high voltages is increased. Therefore, the insulating support 70 has an advantage in that its length can be made small while maintaining its ability to withstand high voltage.

Figure 8:
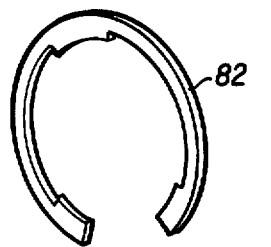
FIGS. 8, 9, and 10 are perspective views of retaining rings for use with the embodiment of the present invention shown in FIG. 7.
Figure 9:
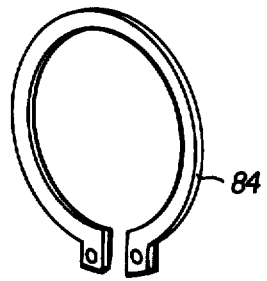
Figure 10:
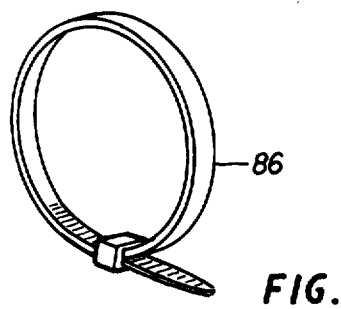

In FIG. 7, the retaining rings 78, 80 are used. An E-type retaining ring 82 shown in FIG. 8, a snap ring 84 shown in FIG. 9, or a tie wrap device 86 shown in FIG. 10 can be used instead of the retaining rings 78, 80 with good results.

In FIG. 11 an insulating support 90 according to another embodiment of the present invention is shown. In FIG. 11 each half section 92, 94 is shown as having a trapezoid shaped cross section and as including a plurality of circumferential corrugations 96 on its exterior surface similar to those shown in FIG. 7. The internal construction of each half section 92, 94 is similar to that of the half sections 11, 12 shown in FIG. 3. The insulating support 90 is assembled by inserting a pair of hexagonal-shaped retaining rings 98 into the corrugations at each end of the insulating support 90.

In the insulating supports according to the embodiments of this invention described above, every insulating support has a partition in the inner side thereof but this invention is not restricted to the embodiments described above. For example, an insulating support with two or more partitions in the inner side thereof can be made.

Next, a method for making an insulating support such as the insulating support 10 shown in FIG. 3 will be described with reference to FIG. 12. In FIG. 12 numeral 135 designates a base made of insulating material which is formed with a predetermined shape. The half section 11 of the insulating support 10 shown in FIG. 3 is made by cutting the base 135. The detailed description is as follows: the base 135 has a plurality of parallel continuous bodies 136, each including a plurality of half sections 11, which are continuously joined by knock-out portions 137. Each continuous body 136 is an elongated semi-cylinder with a plurality of the partitions 13 at predetermined positions on the inner side thereof. Each partition 13 has a semicircular shaped hole 15 concentric to itself.

In order to obtain the half sections 11 from the base 135, firstly the base 135 is cut off at the knock-out portions 137 to obtain a continuous body 136. Secondly the continuous body 136 is cut off at positions between the partitions 13 to obtain the half section 11. When a half section 11 of the length A shown in FIG. 12(a) is required, it can be obtained by cutting the continuous body 136 along the broken lines labeled I-I and II-II, or along the lines II-II and III-III, etc. A half section of length B is obtained by cutting the continuous body 136 along the lines II-II and IV-IV, while a half section of length C is obtained by cutting along the lines I-I and IV-IV. In the embodiment described above, the base 135 is cut off firstly to obtain the continuous body 136 and the continuous body 136 is cut off secondly to obtain the half section. The present invention, however, is not restricted to this method. For example, the base 135 can be cut off at the positions I-I, II-II, III-III and IV-IV thereof firstly and these parts can be cut off at the knock out portions 137 to obtain the half section 11. Furthermore, the continuous body 136 made of insulating material can be formed with a predetermined shape from the beginning, and the continuous body 136 can be cut off at the positions previously described to obtain the half section 11 of the length needed.

The method of making the half section 11 of the insulating support 10 shown in FIG. 3 is described above. A similar method can be used to make the half sections for the embodiments of the subject invention shown in FIGS. 6, 7 and 11.

According to this invention, a device for supporting conductors which is strong enough to withstand the shock of electromagnetic force in a short-circuited condition can be provided. This invention can also provide a device for supporting conductors which can be assembled easily. Furthermore, this invention can provide a device for supporting conductors which is lower in weight as compared to prior art devices. Also, according to this invention, the insulating support can be made with a lesser amount of insulating material as compared to prior art devices. Additionally this invention can provide an insulating support which can be made easily without the necessity of forming threaded bore holes therein. Furthermore, this invention can provide an insulating support which can be adapted to changes in the spacing between the conductors. According to the method of making insulating supports of this invention, insulating supports of different lengths can easily be made without the use of various sized molds.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An insulating support device adapted to support at least one conductor having a hole therein, comprising:
    at least two hollow tubular insulating support members, each said tubular support member including a partition located inside said support member, said partition including a circular hole therein, said circular hole being concentric with said tubular support member, said pair of support members adapted to be disposed adjacent opposing sides of said conductor with the partition holes of said support members adapted to be arranged coaxially with the conductor hole;

an elongated insulating tube passing through said partition holes of said pair of support members and adapted to pass through said conductor hole; and a support rod passing through said insulating tube;

wherein said pair of support members are in a free relationship with said support rod;

wherein each said hollow tubular insulating support member comprises, first and second elongated half sections, each half section having a semi-annular shaped cross-section, each half section including two semi-annular shaped end surfaces and two longitudinal edge surfaces, each half section including a semi-annular shaped partition located therein, said first and second half sections being joined at their respective edge surfaces to form an essentially hollow cylinder, and first and second circular end caps, each of said end caps including a concentric hole therein and a raised edge portion about its periphery, each of said end caps being coupled to said essentially hollow cylinder such that said raised edge portion surrounds a portion of an outer peripheral surface of said essentially hollow cylinder.

2. An insulating support device adapted to support at least one conductor having a hole therein, comprising:

at least two hollow tubular insulating support members, each said tubular support member including a partition located inside said support member, said partition including a circular hole therein, said circular hole being concentric with said tubular support member, said pair of support members adapted to be disposed adjacent opposing sides of said conductor with the partition holes of said support members adapted to be arranged coaxially with the conductor hole;

an elongated insulating tube passing through said partition holes of said pair of support members and adapted to pass through said conductor hole; and a support rod passing through said insulating tube;

wherein said pair of support members are in a free relationship with said support rod;

wherein each said hollow tubular insulating support member comprises, first and second elongated half sections, each half section having a semi-annular shaped cross-section, each half section including two semi-annular shaped end surfaces and two longitudinal edge surfaces, each half section including a semi-annular shaped partition located therein, each half section further including at least one longitudinally extending groove in its outer peripheral surface, said first and second half sections being joined at their respective edge surfaces to form an essentially hollow cylinder, and first and second circular end caps, each of said end caps including a concentric hole therein and at least two raised tabs located at its periphery, each of said end caps being coupled to said essentially hollow cylinder such that each of said at least two raised tabs couples with one of said at least one longitudinally extending grooves in said first and second half sections.

3. An insulating support device adapted to support at least one conductor having a hole therein, comprising:

at least two hollow tubular insulating support members, each said tubular support member including a partition located inside said support member, said partition including a circular hole therein, said circular hole being concentric with said tubular support member, said pair of support members adapted to be disposed adjacent opposing sides of said conductor with the partition holes of said support members adapted to be arranged coaxially with the conductor hole;

an elongated insulating tube passing through said partition holes of said pair of support members and adapted to pass through said conductor hole; and a support rod passing through said insulating tube;

wherein said pair of support members are in a free relationship with said support rod;

wherein each said hollow tubular insulating support member comprises, first and second elongated half sections, each half section having a semi-annular shaped cross-section, each half section including two semi-annular shaped end surfaces and two longitudinal edge surfaces, each half section including a semi-annular shaped partition located therein, each half section including a plurality of semi-circumferential corrugations located about its outer peripheral surface, said first and second half sections being joined at their respective edge surfaces to form an essentially hollow cylinder, and first and second retaining means positioned about the outer periphery of said essentially hollow cylinder for holding said first and second half sections together.

4. An insulating support device as recited in claim 3, wherein:

said first and second retaining means include a pair of retaining rings.

5. An insulating support device as recited in claim 3, wherein:

said first and second retaining means include a pair of "E" shaped rings.

6. An insulating support device as recited in claim 3, wherein:

said first and second retaining means include a pair of snap rings.

7. An insulating support device as recited in claim 3, wherein:

said first and second retaining means include a pair of tie wrap devices.

8. An insulating support device adapted to support at least one conductor having a hole therein, comprising:

at least two hollow tubular insulating support members, each said tubular support member including a partition located inside said support member, said partition including a circular hole therein, said circular hole being concentric with said tubular support member, said pair of support members adapted to be disposed adjacent opposing sides of said conductor with the partition holes of said support members adapted to be arranged coaxially with the conductor hole;

an elongated insulating tube passing through said partition holes of said pair of support members and adapted to pass through said conductor hole; and a support rod passing through said insulating tube;

wherein said pair of support members are in a free relationship with said support rod;

wherein each said hollow tubular insulating support member comprises, first and second elongated half sections, each half section including a hollow elongated body having an essentially trapezoidal shaped cross-section, said essentially trapezoidal shaped cross-section further including a rectangular notch located in a longer base thereof, said hollow elongated body including a plurality of semi-circumferential corrugations located about its outer peripheral surface, each half section including a rectangular shaped partition located therein, said partition including a semi-circular hole therein, each half section further including two longitudinal edge surfaces and two end surfaces, said first and second half sections being joined at their respective edge surfaces to form an essentially hollow body having a polygonal shaped cross-section, and first and second retaining means positioned about the outer periphery of said essentially hollow body for holding said first and second half sections together.

9. An insulating support device as recited in claim 8, wherein:

said first and second retaining means include a pair of angular retaining rings.

10. In combination, a plurality of parallel conductors each including a hole therein, each of said holes in said plurality of parallel conductors having a common axis, and a device for supporting said conductors, wherein said device comprises:

a first bracket member including a first hole therein;

a second bracket member including a second hole therein, said first and second holes being aligned with said common axis, said first bracket member being located on a first side of said plurality of parallel conductors and said second bracket member being located on a second side of said plurality of conductors to position said plurality of parallel conductors therebetween;

an elongated cylindrical insulating member passing through said holes in said plurality of conductors, said insulating member including a longitudinal hole passing therethrough;

a support member positioned in said longitudinal hole in said insulating member, said support member passing through said holes in said first and second bracket members;

fastening means for attaching said support member to said first and second bracket members; and a plurality of hollow tubular insulating supports surrounding said elongated insulating member, one of said insulating supports being located between each of said plurality of conductors, one of said insulating supports being located between a first one of said conductors and said first bracket member, and one of said insulating supports being located between a second one of said conductors and said second bracket member;

wherein each of said tubular insulating supports includes a centrally located partition therein, said partition including a hole therein, said support member passing through said hole in said partition and being in a free relationship therewith, such that a tensile force applied to said support member due to an electromagnetic force associated with said conductors does not act on said tubular insulating supports;

wherein said hole provided in the centrally located partition of each of said insulating supports is concentric with said tubular insulating support, and wherein at least one of said hollow tubular insulating supports comprises, first and second elongated half sections, each half section having a semi-annular shaped cross-section, each half section including two semi-annular shaped end surfaces and two longitudinal edge surfaces, each half section including a semi-annular shaped partition located therein, said first and second half sections being joined at their respective edge surfaces to form an essentially hollow cylinder, and first and second circular end caps, each of said end caps including a concentric hole therein and a raised edge portion about its periphery, each of said end caps being coupled to said essentially hollow cylinder such that said raised edge portion surrounds a portion of an outer peripheral surface of said essentially hollow cylinder.

11. In combination, a plurality of parallel conductors each including a hole therein, each of said holes in said plurality of parallel conductors having a common axis, and a device for supporting said conductors, wherein said device comprises:

a first bracket member including a first hole therein;

a second bracket member including a second hole therein, said first and second holes being aligned with said common axis, said first bracket member being located on a first side of said plurality of parallel conductors and said second bracket member being located on a second side of said plurality of conductors to position said plurality of parallel conductors therebetween;

an elongated cylindrical insulating member passing through said holes in said plurality of conductors, said insulating member including a longitudinal hole passing therethrough;

a support member positioned in said longitudinal hole in said insulating member, said support member passing through said holes in said first and second bracket members;

fastening means for attaching said support member to said first and second bracket members; and a plurality of hollow tubular insulating supports surrounding said elongated insulating member, one of said insulating supports being located between each of said plurality of conductors, one of said insulating supports being located between a first one of said conductors and said first bracket member, and one of said insulating supports being located between a second one of said conductors and said second bracket member;

wherein each of said tubular insulating supports includes a centrally located partition therein, said partition including a hole therein, said support member passing through said hole in said partition and being in a free relationship therewith, such that a tensile force applied to said support member due to an electromagnetic force associated with said conductors does not act on said tubular insulating supports;

wherein said hole provided in the centrally located partition of each of said insulating supports is concentric with said tubular insulating support;

wherein at least one of said hollow tubular insulating supports comprises, first and second elongated half sections, each half section having a semi-annular shaped cross-section, each half section including two semi-annular shaped end surfaces and two longitudinal edge surfaces, each half section including a semi-annular shaped partition located therein, each half section further including at least one longitudinally extending groove in its outer peripheral surface, said first and second half sections being joined at their respective edge surfaces to form an essentially hollow cylinder, and first and second circular end caps, each of said end caps including a concentric hole therein and at least two raised tabs located at its periphery, each of said end caps being coupled to said essentially hollow cylinder such that each of said at least two raised tabs couples with one of said at least one longitudinally extending grooves in said first and second half sections.

12. In combination, a plurality of parallel conductors each including a hole therein, each of said holes in said plurality of parallel conductors having a common axis, and a device for supporting said conductors, wherein said device comprises:

a first bracket member including a first hole therein;

a second bracket member including a second hole therein, said first and second holes being aligned with said common axis, said first bracket member being located on a first side of said plurality of parallel conductors and said second bracket member being located on a second side of said plurality of conductors to position said plurality of parallel conductors therebetween;

an elongated cylindrical insulating member passing through said holes in said plurality of conductors, said insulating member including a longitudinal hole passing therethrough;

a support member positioned in said longitudinal hole in said insulating member, said support member passing through said holes in said first and second bracket members;

fastening means for attaching said support member to said first and second bracket members; and a plurality of hollow tubular insulating supports surrounding said elongated insulating member, one of said insulating supports being located between each of said plurality of conductors, one of said insulating supports being located between a first one of said conductors and said first bracket member, and one of said insulating supports being located between a second one of said conductors and said second bracket member;

wherein each of said tubular insulating supports includes a centrally located partition therein, said partition including a hole therein, said support member passing through said hole in said partition and being in a free relationship therewith, such that a tensile force applied to said support member due to an electromagnetic force associated with said conductors does not act on said tubular insulating supports;

wherein said hole provided in the centrally located partition of each of said insulating supports is concentric with said tubular insulating support;

wherein at least one of said hollow tubular insulating supports comprises, first and second elongated half sections, each half section having a semi-annular shaped cross-section, each half section including two semi-annular shaped end surfaces and two longitudinal edge surfaces, each half section including a semi-annular shaped partition located therein, each half section including a plurality of semi-circumferential corrugations located about its outer peripheral surface, said first and second half sections being joined at their respective edge surfaces to form an essentially hollow cylinder, and first and second retaining means positioned about the outer periphery of said essentially hollow cylinder for holding said first and second half sections together.

13. A combination as recited in claim 12, wherein:
said first and second retaining means include a pair of retaining rings.

14. A combination as recited in claim 12, wherein:
said first and second retaining means include a pair of "E" shaped rings.

15. A combination as recited in claim 12, wherein:
said first and second retaining means include a pair of snap rings.

16. A combination as recited in claim 12, wherein:
said first and second retaining means include a pair of tie wrap devices.

17. In combination, a plurality of parallel conductors each including a hole therein, each of said holes in said plurality of parallel conductors having a common axis, and a device for supporting said conductors, wherein said device comprises:

a first bracket member including a first hole therein;

a second bracket member including a second hole therein, said first and second holes being aligned with said common axis, said first bracket member being located on a first side of said plurality of parallel conductors and said second bracket member being located on a second side of said plurality of conductors to position said plurality of parallel conductors therebetween;

an elongated cylindrical insulating member passing through said holes in said plurality of conductors, said insulating member including a longitudinal hole passing therethrough;

a support member positioned in said longitudinal hole in said insulating member, said support member passing through said holes in said first and second bracket members;

fastening means for attaching said support member to said first and second bracket members; and a plurality of hollow tubular insulating supports surrounding said elongated insulating member, one of said insulating supports being located between each of said plurality of conductors, one of said insulating supports being located between a first one of said conductors and said first bracket member, and one of said insulating supports being located between a second one of said conductors and said second bracket member;

wherein each of said tubular insulating supports includes a centrally located partition therein, said partition including a hole therein, said support member passing through said hole in said partition and being in a free relationship therewith, such that a tensile force applied to said support member due to an electromagnetic force associated with said conductors does not act on said tubular insulating supports;

wherein said hole provided in the centrally located partition of each of said insulating supports is concentric with said tubular insulating support;

wherein said at least one of said hollow tubular insulating supports comprises, first and second elongated half sections, each half section including a hollow elongated body having an essentially trapezoidal shaped cross-section, said essentially trapezoidal shaped cross-section further including a rectangular notch located in a longer base thereof, said hollow elongated body including a plurality of semi-circumferential corrugations located about its outer peripheral surface, each half section including a rectangular shaped partition located therein, said partition including a semi-circular hole therein, each half section further including two longitudinal edge surfaces and two end surfaces, said first and second half sections being joined at their respective edge surfaces to form an essentially hollow body having a polygonal shaped cross-section, and first and second retaining means positioned about the outer periphery of said essentially hollow body for holding said first and second half sections together.

18. A combination as recited in claim 17 wherein:

said first and second retaining means include a pair of angular retaining rings.

* * * * *